United States Patent [19]
Ohmori

[11] Patent Number: 5,635,983
[45] Date of Patent: Jun. 3, 1997

[54] ELECTRONIC STILL CAMERA SYSTEM AND AUXILIARY UNIT CONTAINING CONTROL PROGRAM

[75] Inventor: Seishi Ohmori, Tokyo, Japan

[73] Assignee: Eastman Kodak Company, Rochester, N.Y.

[21] Appl. No.: 538,539

[22] Filed: Oct. 3, 1995

[30] Foreign Application Priority Data

Nov. 10, 1994 [JP] Japan ................................. 6-245380

[51] Int. Cl.$^6$ .................................................. H04N 5/76
[52] U.S. Cl. ....................... 348/232; 348/233; 358/909.01
[58] Field of Search ........................... 348/222, 231, 348/233, 232, 373, 375; 358/909.1; H04N 8/228, 5/76

[56] References Cited

U.S. PATENT DOCUMENTS 5,153,730  10/1992  Nagasaki ................................. 348/231
5,262,868  11/1993  Kaneko ................................... 348/233

FOREIGN PATENT DOCUMENTS 3-268583  11/1991  Japan ......................... H04N 5/225

*Primary Examiner*—Sherrie Hsia
*Attorney, Agent, or Firm*—David M. Woods

[57] ABSTRACT

To provide an electronic still camera system which is improved in efficiency of development, extensibility and maintenance, the electronic still camera system consists of an electronic still camera 2 and an auxiliary unit 4. The electronic still camera 2 includes a microcomputer 10 for controlling the entire system, a main body memory accessed by the microcomputer 10 and a communication circuit for transferring data between the auxiliary unit 4 and the communication circuit. On the other hand, the auxiliary unit 4 includes a memory storing a program required to control the auxiliary unit 4 and another communication circuit for transferring data between the electronic still camera 2 and the communication circuit. Prior to control of the auxiliary unit 4, data is transferred from the program memory to the main body memory. Therefore, it is not required that the auxiliary unit control program has been previously stored in the main body memory.

6 Claims, 3 Drawing Sheets

ELECTRONIC STILL CAMERA SYSTEM AND AUXILIARY UNIT CONTAINING CONTROL PROGRAM

FIELD OF THE INVENTION

The present invention relates to an electronic still camera and particularly to a system for controlling an auxiliary unit connectable to such an electronic still camera.

BACKGROUND OF THE INVENTION

Many electronic still cameras are well known which are adapted to record an object as digital image data. An image formed through an optical system is converted into electrical signals by a photoelectric conversion element such as a CCD or the like, these electric signals being then recorded in a storage medium within the camera body. The image data thus recorded can be easily edited or processed by an electronic instrument since they are in digital form, unlike the conventional camera images. Auxiliary units utilizing such a feature have been developed. Among them, a hard disc unit will be described which is used to store a mass of image data.

The electronic still cameras convert the taken image into digital signals which are in turn stored in a memory within the main body of the camera, which memory will be simply referred to as "main body memory". In general, such a memory has a capacity that cannot store many images. If the number of taken images reaches a given level, they must be transferred to another storage medium. Thus, the electronic still cameras usually contain a floppy disc drive to which the stored image data are often transferred from the main body memory. Floppy discs are light-weight, cheap and convenient for subsequent editing.

However, the floppy disc is also naturally restricted in capacity. If a number of high-resolution images, each having a large amount of data, are to be recorded, still another storage medium having a much greater capacity is required. Hard discs meet such a requirement With the development of storage systems and manufacturing techniques, it has recently become possible to provide a hard disc of cigarette-case size that has a capacity exceeding 100 MB. Such a capacity corresponds to that of 100 floppy discs. When the floppy discs are replaced by such a hard disc, the number of images that can be taken by the electronic still cameras is hugely increased.

The hard disc used as an auxiliary unit in the electronic still camera was developed aiming at such an advantage. Since the hard disc is relatively compact, for example, it may be connected to the bottom of the electronic still camera such that taken image data will be appropriately recorded therein. As a result, the number of images to be recorded can be hugely increased while maintaining the main body memory physically small. With future development of various auxiliary units, including hard disc units, it is expected that the application and possibility of electronic still cameras will be further widened.

As described, electronic still cameras were released from the restriction relating to the number of images to be recorded through merchandising of hard disc units. The development of such an auxiliary unit raises another new problem due to the conventional programs for controlling the auxiliary unit which have been stored in the main body memory and normally in ROE. Such a problem will be described with reference to the drawings.

FIG. 1 is a schematic view of an electronic still camera system that comprises an electronic still camera and an auxiliary unit.

Referring to FIG. 1, an auxiliary unit 4 is connected to the bottom of an electronic still camera 2 such that data can be transmitted and received therebetween through data and control buses 6, 8.

The electronic still camera 2 contains a microcomputer 10 for controlling the entire system. A program to be executed by the microcomputer 10 has been stored in ROM 12. The ROM 12 may be included in the microcomputer 10.

The electronic still camera system also comprises a user interface section 14 on which a plurality of control buttons 16 for a user to command various operations in the system are provided. On sequentially depressing these control buttons 16, a procedure 18 such as interruption is initiated. Thus, the microcomputer 10 reads the necessary program routine from the ROM 12 which in turn executes the user's command.

FIG. 2 is a memory map for illustrating the internal structure of the ROM 12.

As shown, the ROM 12 comprises at least a basic processing area 20 for starting up the system and carrying out the basic operations of the camera and an extended processing area 22 which stores a program for controlling auxiliary units. The extended processing area 22 is formed by areas 22-1, 22-2 ... 22-n which correspond to program areas for the auxiliary units 1, 2 ... n.

Problems are raised in the above arrangement because of the provision of the extended processing area 22 within the ROM 12. The problems will be described from a plurality of viewpoints.

The Viewpoint of Development

The ROM 12 is included within the electronic still camera 2. At a point in time when the electronic still camera 2 is to be produced into a final article, it is required that the contents of a program to be stored in the ROM 12 have been determined. However, it is quite common for the electronic still camera 2 to be a main product that is developed prior to the development of the auxiliary unit 4. It is thus difficult to previously store a program for controlling the auxiliary unit 4 in the ROM 12. Even if the specification of an auxiliary unit 4 to be developed in the future is known, it may be required to allocate the extended processing area 22 to the memory or to change the contents of the memory when the number of auxiliary units 4 to be supported increases or when the specification thereof is to be changed. In view of these uncertain requirements, the developer has an increased burden.

The Viewpoint of System Extension

As is well known in the art, the completion of the auxiliary unit 4 becomes a very important factor that determines the saleable value of the electronic instrument. Even in the electronic still camera 2, it is required to develop not only the hard disc, but also various other units such as voice units, video units and others. However, it is rare that the specification of all the auxiliary units 4 to be produced in the future has been determined at the stage of development of the electronic still camera 2. It is common practice that the subsequent development is often restricted by the contents of a program initially stored in the ROM 12. In this sense, the system extensibility may be inhibited through provision of the extended processing area 22 in the ROM 12.

The Viewpoint of Product Maintenance

As a result of the late development of the auxiliary unit 4, the program stored in the extended processing area 22 may be insufficiently verified. In the worst case, it may be believed that the auxiliary unit 4 to be sold does not properly function due to a defective program. This leads to many inconveniences such as withdrawal of already sold electronic still cameras 2 for re-programming. There may be cases where the electronic still cameras 2 which initially functioned in the proper manner will not function properly due to subsequent improvement or re-design. If the auxiliary units 4 of the same structure function in a different manner, depending on when they are produced, it will no longer be possible to overcome the problem by simply adjusting the contents of the ROM 12.

SUMMARY OF THE INVENTION

To overcome the above problems in the prior art, an object of the present invention is to provide an electronic still camera system which has improved development efficiency, extensibility, maintenance and other factors as a result of storing the necessary control program in an auxiliary unit.

To this end, the present invention provides an electronic still camera system comprising an electronic still camera for converting an image into digital data and an auxiliary unit connectable to the electronic still camera, the electronic still camera including a microcomputer for controlling the entire system, a main body memory accessed by the microcomputer and a communication circuit for transferring data between the communication circuit and the auxiliary unit, and the auxiliary unit including a program memory storing a program required to control to auxiliary unit and another communication circuit for transferring data between the other communication circuit and the electronic still camera, whereby, prior to control of the auxiliary unit, the data stored in the program memory can be transferred to the main body memory, the data being then accessed by the microcomputer.

In the electronic still camera system of the present invention, the electronic still camera may include a microcomputer for controlling the entire system and a selection circuit for selecting a memory from which data is to be read out by the microcomputer, and the auxiliary unit may include a program memory storing a program necessary to control the auxiliary unit, whereby at least when the auxiliary unit is to be controlled, the data can be read out from the program memory by said microcomputer.

In such an arrangement, the microcomputer included in the electronic still camera refers to the main body memory and controls the entire system. On the other hand, the auxiliary unit stores the control program required to control the auxiliary unit. Since both the electronic still camera and the auxiliary unit have their communication circuits, the data can be transferred therebetween. When the electronic still camera is control the auxiliary unit, therefore, the program stored in the auxiliary unit is first transferred to the main body memory. Subsequently, the main body memory can be referred to when performing all the controls.

The electronic still camera system of the present invention includes the selection circuit for selecting a memory from which the data is to be read out by the microcomputer. When the auxiliary unit is to be controlled, therefore, the program stored in the auxiliary unit can be read out directly from the microcomputer.

DETAILED DESCRIPTION OF THE INVENTION

Figure 3:
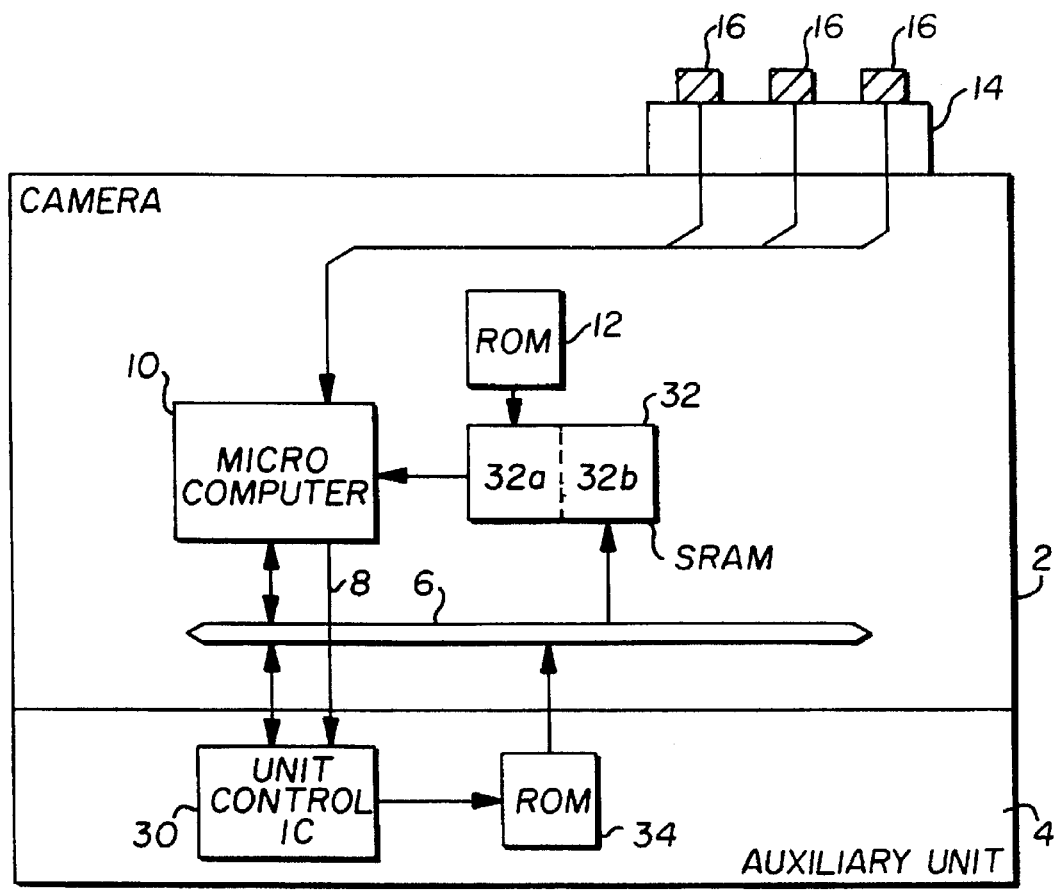
FIG. 3 is a view showing the structure of an electronic still camera system according to the first embodiment of the present invention.

FIG. 3 is a view showing the structure of an electronic still camera system according to the first embodiment of the present invention. In the first embodiment, parts similar to those of the prior art shown in FIG. 1 have similar reference numerals.

Figure 1:
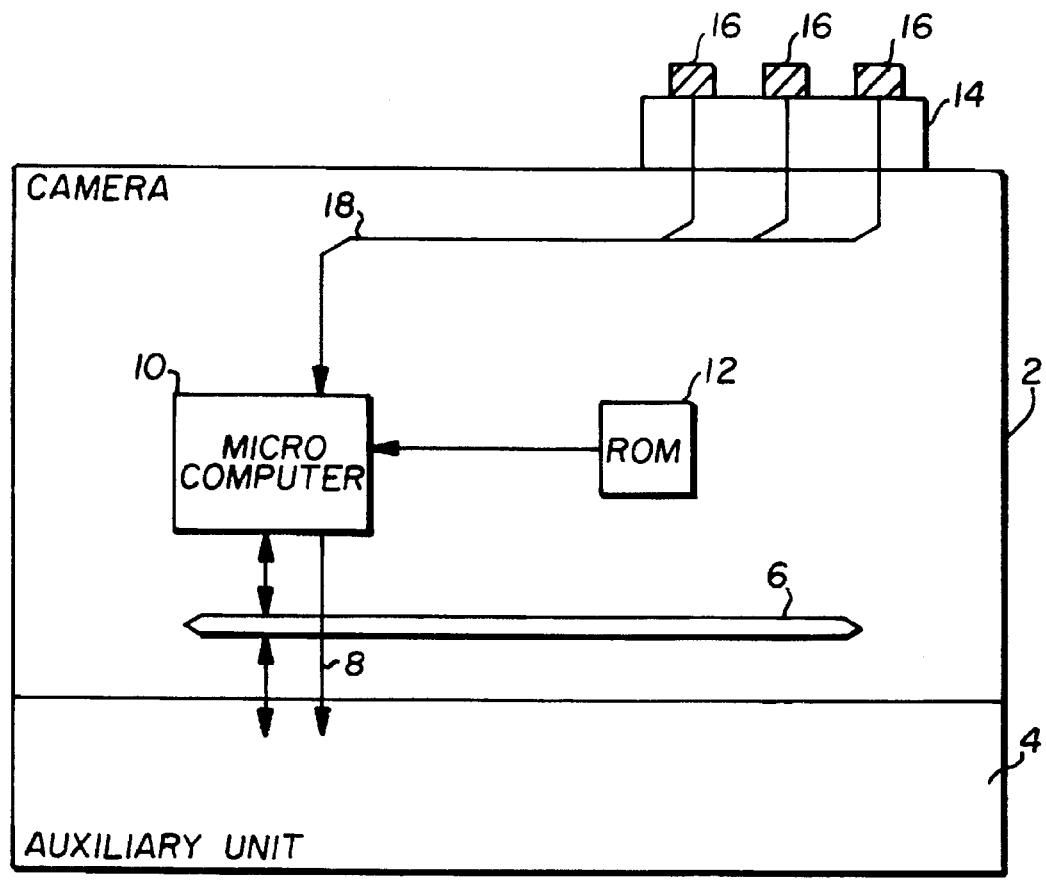
FIG. 1 is a schematic view of a prior art electronic still camera system comprising an electronic still camera and an auxiliary unit.

As in FIG. 1, the electronic still camera system of the first embodiment comprises an auxiliary unit 4 connected to the bottom of an electronic still camera 2. Data and control buses 6, 8 are connected to a unit control IC 30 in the auxiliary unit 4. The unit control IC 30 is adapted to control the function of the auxiliary unit 4. The main body of the electronic still camera 2 includes an SRAM 32 in addition to the components shown in FIG. 1. The SRAM 32 is internally divided into two areas 32a and 32b. As will be described, one area 32a receives data from the ROM 12.

On the other hand, the auxiliary unit 4 additionally includes a program ROM 34 which characterizes the present invention. The program ROM 34 has stored therein a program required to control the auxiliary unit 4. This program will be copied to the area 32b in the SRAM 32, as will be described. A user interface section 14 and a plurality of control buttons 16 are similar to those of the prior art shown in FIG. 1.

The function of this system will be described below.

Figure 2:
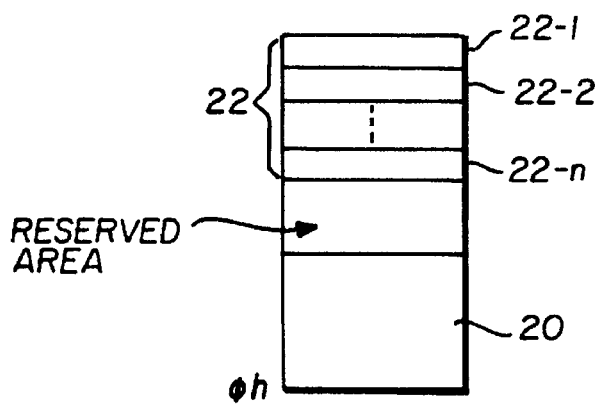
FIG. 2 is a memory map for illustrating the internal structure of ROM 12 in the prior art system.

The present invention is characterized by the fact that the ROM 12 does not have a program required to control the auxiliary unit 4, that is, data to be included in an extended processing area 22 shown in FIG. 2 and that such data is alternatively stored in the program ROM 34 of the auxiliary unit 4. Therefore, the system of the first embodiment can be operated through the following procedure.

Upon start-up, all the data are first copied from the ROM 12 to the area 32a of the SRAM 32. A command is then provided to the unit control IC 30 so that all the data will be copied from the program ROM 34 to the area 32b of the SRAM 32. Through these two copying steps, the microcomputer 10 can subsequently read out the data from the SRAM 32 when the system is to be controlled. As a result, the control of data read-out can be facilitated while utilizing the high-speed SRAM to improve the process performance in the system.

In the first embodiment, thus, it is not required that any program for controlling the auxiliary unit 4 is previously stored in the main body of the electronic still camera 2. This can overcome the aforementioned problems in the prior art. More particularly, it is not required that the contents of the ROM 12 are determined depending on the specification of the auxiliary unit 4. Furthermore, the main body of the electronic still camera 2 will not be influenced by the condition of the auxiliary unit 4. For example, even if an auxiliary unit 4 is not perfectly planned at the development of the electronic still camera 2 to be developed, it is not necessary to change the main body of the electronic still camera 2. Therefore, the efficiency of development of the entire system, the extensibility of the system and the maintenance of the product can all be improved.

Although the first embodiment has been described such that the data is copied from the ROM 12 to the SRAM 32 to simplify the subsequent program read-out of the microcomputer 10, such a copying step is not necessarily required. Data may be read out from the ROM 12 at a location corresponding to the basic processing area 20 in FIG. 2 and only data corresponding to the extended processing area 22 may be read out from the SRAM 32. Thus, the capacity of the SRAM 32 can be minimized.

Figure 4:
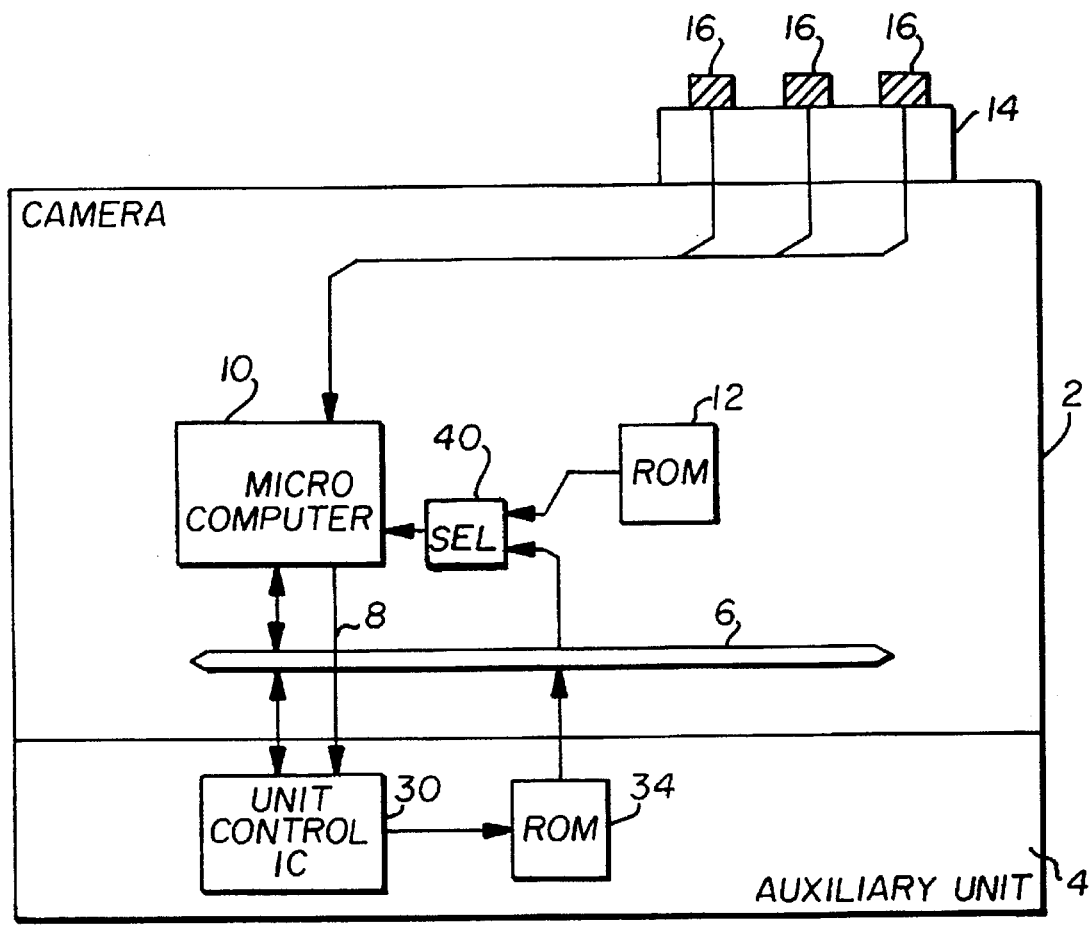
FIG. 4 is a view showing the structure of an electronic still camera system according to the second embodiment of the present invention.

FIG. 4 is a view showing the structure of an electronic still camera system according to the second embodiment of the present invention. In the second embodiment, parts similar to those of the first embodiment have similar reference numerals.

As in the first embodiment, the electronic still camera system of the second embodiment comprises an auxiliary unit 4 connected to the bottom of an electronic still camera 2. Data and control buses 6, 8 are connected to a unit control IC 30 in the auxiliary unit 4. Unlike the first embodiment, however, the main body of the electronic still camera 2 does not include an SRAM. In place of the SRAM, the electronic still camera 2 additionally includes a selector 40 for selecting data to be transferred to the microcomputer 10 from data in the ROM 12 and an auxiliary unit program ROM 34. A user interface section 14 and control buttons 16 are similar to those of the first embodiment.

The function of the system will be described.

The second embodiment of the present invention is characterized by the fact that a memory to be read out by the microcomputer 10 is selected depending on the type of control. More particularly, data to be contained in the basic processing area 20 of FIG. 2 will be read out from the ROE 12 while data to be included in the extended processing area 22 will be read out from the program ROM 34 of the auxiliary unit 4.

Such a selection is made by the selector 40. More particularly, the selector 40 is fixed to read the data from the ROM 12 at all times when the connection of the auxiliary unit 4 is not sensed. If the connection of the auxiliary unit 4 is sensed, the selector 40 is then controlled to read the data from the program ROM 34 only when an address area relating to the control of the auxiliary unit 4 is accessed. As a result, the basic process will be carried out using the data from the ROM 12 while the control of the auxiliary unit 4 will be performed using the data from the program ROM 34.

However, the selector 40 is not necessarily required in the second embodiment. That is because when the ROM 12 and program ROM 34 are previously set not to have any overlapped address space irrespective of the connection of the auxiliary unit 4, such an arrangement may be made that the data output of the ROM 12 is permitted only when the address space of the ROM 12 is accessed. In such a case, the ROM 12 and program ROM 34 can be connected to the same data bus 6 without passage through a buffer IC. In such an arrangement, when the address space of the program ROM 34 is accessed, the desired data will be read out from the program ROM 34 if the auxiliary unit 4 is connected to the program ROM 34. If the auxiliary unit 4 is not connected to the program ROM 34, data different from data to be driven will be written into the program ROM 34. When the data bus 6 has been previously subjected to pull-up or the like, therefore, the desired data can be distinguished from the undesired data.

As described, the second embodiment can overcome the problems of the prior art, as in the first embodiment. Since the second embodiment does not require any SRAM for copying the data of the program ROM 34, it can reduce the number of parts, in comparison with the first embodiment.

As described, the auxiliary unit itself of the electronic still camera system of the present invention includes a program required to control the auxiliary unit. Therefore, the specification of the auxiliary unit is not essential when designing the electronic still camera.

If the auxiliary unit control program is temporarily transferred to the main body memory, the performance of the process in the system can be improved by utilizing the high-speed main body memory. On the other hand, the number of parts can be optimized if the auxiliary unit program is directly read out therefrom.

In any event, the main body of the electronic still camera can be developed independently of the auxiliary unit. This can improve the efficiency of development. Since the main body of the electronic still camera will be not influenced by the specification of the auxiliary unit, the future extensibility and maintenance of the system can be highly improved.

PARTS LIST

| | |
|---|---|
| 2 | electronic still camera |
| 4 | auxiliary unit |
| 6 | control bus |
| 8 | control bus |
| 10 | microcomputer |
| 12 | ROM |
| 14 | user interface section |
| 16 | control buttons |
| 18 | procedure |
| 20 | basic processing area |
| 22 | extended processing area |
| 22-1, 22-2, ... 22-n | program areas for the auxiliary units 1, 2, ... n |
| 30 | unit control IC |
| 32 | SRAM |
| 32a and 32b | SRAM areas |
| 34 | ROM |
| 40 | selector |

I claim:

1. An electronic still camera system comprising an electronic still camera for converting an image into digital data and an auxiliary unit connectable to the electronic still camera, said electronic still camera comprising:

a microcomputer for controlling the still camera system;

a main body memory accessed by the microcomputer; and a communication circuit, for transferring data between said communication circuit and said auxiliary unit, said auxiliary unit comprising;

a program memory storing control data comprising a program required to control the auxiliary unit; and another communication circuit for transferring the control data between said another communication circuit and said electronic still camera, whereby prior to control of the auxiliary unit, the control data stored in said program memory can be transferred to said main body memory, said control data being then accessed by said microcomputer.

2. An electronic camera system as claimed in claim 1 wherein said auxiliary unit includes an auxiliary unit control circuit and wherein, upon a command from said microcomputer, the auxiliary unit control circuit copies the control data into said main body memory.

3. An electronic camera system as claimed in claim 1 wherein said microcomputer includes means for addressing memory locations in the program memory, and whereby prior to control of the auxiliary unit, the control data stored in said program memory is read out by said microcomputer to said main body memory.

4. An electronic still camera system comprising an electronic still camera for converting an image into digital data and an auxiliary unit connectable to the electronic still camera, said auxiliary unit comprising:

a program memory storing control data comprising a program necessary to control the auxiliary unit; and said electronic still camera comprising:

a microcomputer for controlling the still camera system;

a main body memory storing operational data comprising a program necessary to control the camera;

means for selecting one of said program memory or said main body memory from which one of said control data or operational data is to be read out by said microcomputer, whereby at least when said auxiliary unit is to be controlled, the control data can be read out from said program memory by said microcomputer.

5. The electronic still camera system as claimed in claim 4 wherein said selecting means comprises a selector circuit for selecting one of said program memory or said main body memory.

6. The electronic still camera system as claimed in claim 4 wherein said selecting means comprises a common data bus connected to both said main body memory and said program memory and said microcomputer includes means for addressing a respective address space of either said program memory or said main body memory.

* * * * *